United States Patent [19]

Lohrke et al.

[11] Patent Number: 4,752,518
[45] Date of Patent: Jun. 21, 1988

[54] FLEXIBLE SURFACE DEFORMATION-RESISTANT GRAPHITE FOIL

[75] Inventors: James L. Lohrke, Valencia; Janet M. Sterry, Canoga Park; Michael D. Lyons, Saugus, all of Calif.

[73] Assignee: Polycarbon, Inc., Valencia, Calif.

[21] Appl. No.: 892,794

[22] Filed: Jul. 31, 1986

[51] Int. Cl.⁴ .......................... B32B 3/10; B32B 9/00; B29C 59/00; B28B 1/48

[52] U.S. Cl. ..................... 428/131; 428/132; 428/134; 428/408; 264/119; 264/154; 264/155; 264/156

[58] Field of Search ............... 428/131, 132, 133, 408, 428/134, 135, 136, 137, 156, 155; 264/119, 154, 156, 155

[56] References Cited

U.S. PATENT DOCUMENTS 2,653,889 9/1953 Hager et al. ................ 428/920
3,404,061 10/1968 Shane et al. ................. 428/64
4,534,922 8/1985 Atkinson et al. ............. 264/119

OTHER PUBLICATIONS

*Webster's Seventh New Collegiate Dictionary*, (G & C Merriam Co., Springfield, MA) C. 1967, p. 41.

Primary Examiner—Norman Morgenstern
Assistant Examiner—Margaret Burke
Attorney, Agent, or Firm—Blakely, Sokoloff Taylor, Zafman

[57] ABSTRACT

In a graphite material comprising a mass of expanded graphite particles compressed together so as to form a graphite foil, the graphite foil is provided with a plurality of apertures disposed on at least one surface thereof so as to substantially prevent formation of bubble-like deformations which occur when the graphite foil is heated and/or placed in a vacuum. The method of making the invented foil and devices used to make said foil are also disclosed.

21 Claims, 1 Drawing Sheet

U.S. Patent  Jun. 21, 1988  4,752,518
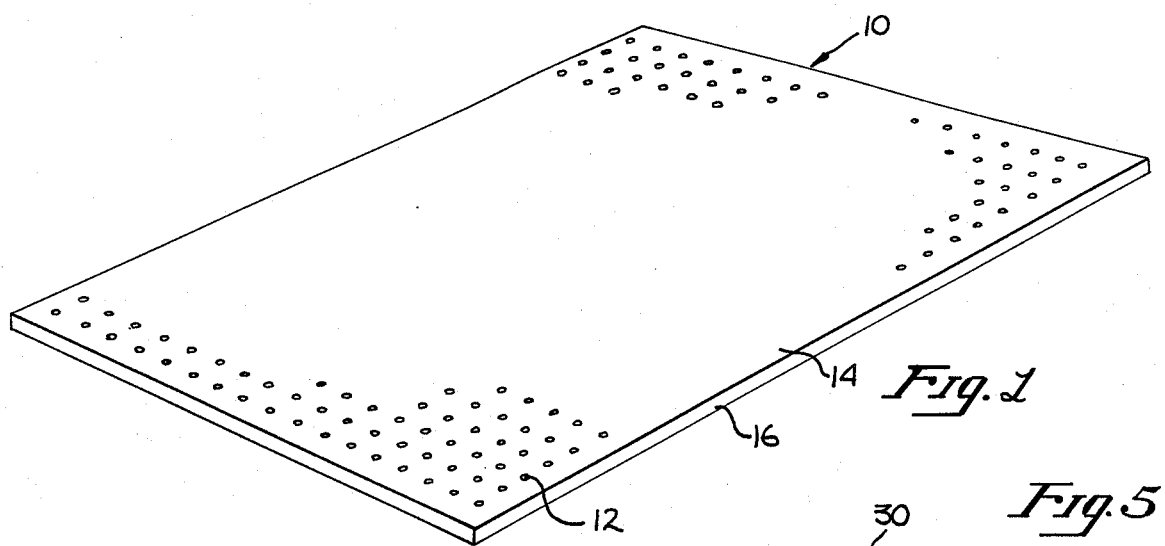
Fig. 1
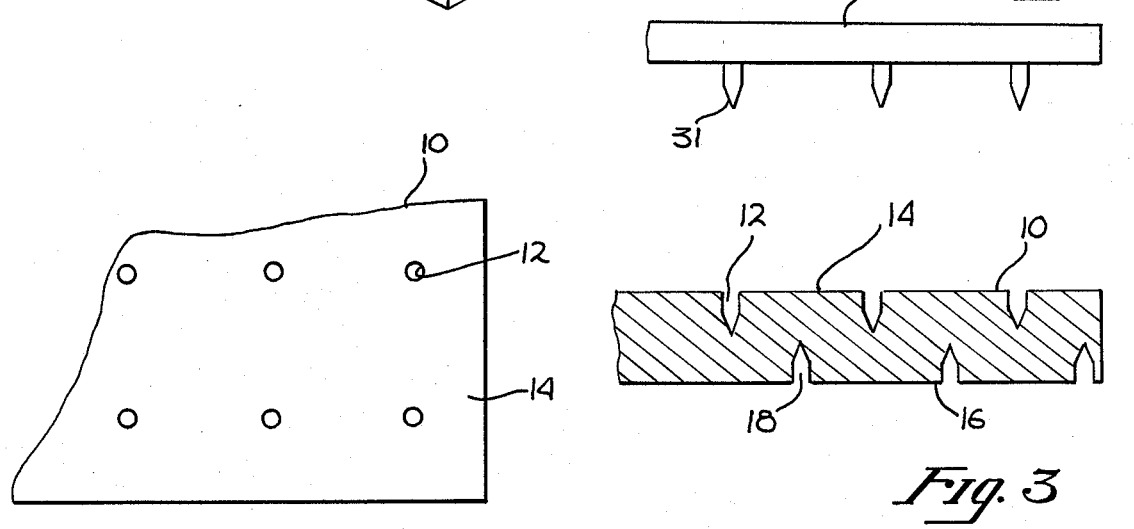
Fig. 5
Fig. 2
Fig. 3
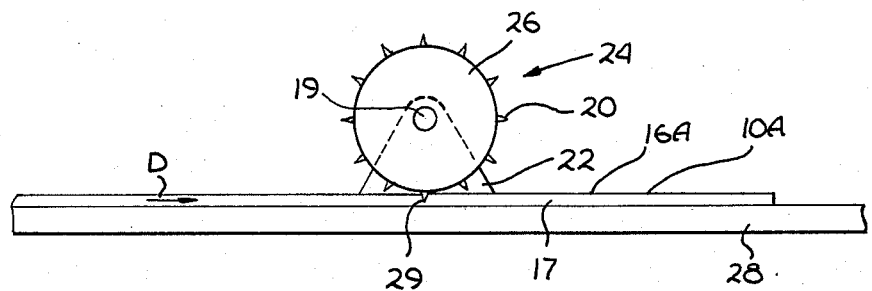
Fig. 4

FLEXIBLE SURFACE DEFORMATION-RESISTANT GRAPHITE FOIL

FIELD OF THE INVENTION

The present invention relates to graphite material and more particularly, to graphite material comprising a mass of expanded graphite particles compressed together to form flexible graphite foil.

BACKGROUND OF THE INVENTION

Graphites are made up of layer planes of hexagonal arrays or networks of carbon atoms. These layer planes of hexagonally arranged carbon atoms are substantially flat and are oriented or so ordered as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size; the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties which are highly directional. Briefly, graphites may be characterized as laminated structures of carbon, that is, structures consisting of superimposed layers or laminae of carbon atoms joined together by weak van der Waals forces between layer planes, but strong covalent bonds exist within layer planes. In considering the graphite structure, two axes or directions are usually noted, to wit, the c axis or direction and the a axis or direction. For simplicity, the c axis or direction may be considered as the direction perpendicular to the carbon layers. The a axis or direction may be considered as the directions parallel to the carbon layers or the direction perpendicular to the c direction.

Among the graphites which may exhibit or possess a high degree of orientation, mention may be made of natural graphites, Kish graphite and synthetic graphites such as for example, pyrolytic graphites. Natural graphites are generally found or obtained in the form of small, soft flakes or powder. Kish graphite is the excess carbon which crystallizes out in the course of smelting iron. The graphite separates as fine flakes and is very similar to flake natural graphite. Synthetic graphites are produced by the pyrolysis or thermal decomposition of a carbonaceous gas on a suitable substrate or mandrel heated at an elevated temperature. The graphite, usually in the form of a massive, coherent deposit can be separated from the substrate in the form of coherent masses or bodies. If desired, the graphite masses can be pulverized, comminuted, shaved, or the like to produce synthetic graphite particles, e.g. powder, chip, flake, or the like of any desired size.

As noted above, the bending forces holding the parallel layers of carbon atoms together are only weak van der Waals forces. It has been found that graphites having a high degree of orientation such as, for example, natural graphites, Kish graphite and synthetic graphites and heat treated pyrolytic graphites can be treated so that the spacing between the superimposed carbon layers or laminae can be appreciably opened up so as to provide a marked expansion in the direction perpendicular to the layers, that is, in the c direction and thus form an expanded or intumesced graphite structure in which the laminar character is substantially retained.

In U.S. Pat. Nos. 1,137,373 and 1,191,383, natural graphite in the form of flake or powder of a size too great to pass through a 200 mesh screen is expanded by first subjecting the graphite particles for a suitable period of time to a oxidizing environment or medium maintained at a suitable temperature. Upon completion of the oxidizing treatment, the soggy graphite particles or masses are washed with water and then heated to between about 350° C. and 600° C. to more fully expand the graphite particles in the c direction. The oxidizing mediums disclosed are mixtures of sulfuric and nitric acids and mixtures of nitric acid and potassium chlorate.

By the above treatment, expansions of the natural graphite particles of up to about 25 times the original bulk were obtained. There is also disclosed that the expanded natural graphite can be compounded with a binder, e.g. a phenolic resin and the resultant composition compressed or molded into various forms, such as discs, rings, rods, foil, sheets, etc.

The sheet material formed from graphite particles having the desired degree of expansion also possesses substantial flexibility or pliability and can be made to have a density within the range of from about 5 pounds per cubic foot to a density approaching theoretical, that is, about 147 pounds per cubic foot.

In addition to the unique advantage of flexibility, the sheet material has also been found to possess an appreciable degree of anisotropy. Sheet material can be produced which has excellent flexibility, good strength and a high degree of orientation. Such highly oriented material possesses the excellent anisotropy or highly directional properties of pyrolytic graphite.

Briefly, the process of producing flexible, binderless graphite sheet material, e.g. web, paper, strip, tape, foil, mat or the like comprises compressing or compacting under a predetermined load and in the absence of a binder, expanded graphite particles which have a c direction dimension which is at least 80 times, and preferably 200 times, that of the original particles so as to form a substantially flat, flexible, integrated graphite sheet or foil. It should be noted that the expanded graphite particles which generally are worm-like or vermiform in appearance once compressed will maintain the compression set. The density and thickness of the sheet material can be varied by controlling the degree of compression.

Additionally, other methods for inducing, expanding and compressing condition to the graphite may be employed. These methods include chemical treatment of natural graphite and heat treated pyrolytic graphite particles are treated over predetermined time periods to a variety of oxidizing or intercalating solutions (e.g. $H_2SO_4$, $HNO_3$, $KMnO_4$, $FeCl_3$, etc.) at temperatures ranging from about room temperature to about 125° C. The graphite particles utilized can range in size from a dust or fine powder small enough to pass through a 325 mesh screen to a size such that no dimension is greater than about one inch.

Additionally, various oxidizing agents and oxidizing mixtures may be employed to effect a controlled interlayer attack of the graphite particles. Such agents are, for example, nitric acid, potassium chlorate, chromic acid, potassium permanganate, potassium chromate, potassium dichromate, perchloric acid and the like. The mixtures used to achieve interlayer attack of the graphites may be, for example concentrated nitric acid and potassium chlorate, chromic acid and phosphoric acid, sulphuric acid and nitric acid etc. or mixtures of a strong organic acid, (e.g. trifluoroacetic acid ) in a strong oxidizing agent soluble in the organic acid used. As will be appreciated by those skilled in the art, a wide range of oxidizing agent concentrations can be utilized.

It will also be appreciated that the opening up or spreading apart of carbon layers can be achieved by chemically treating the graphite particles with an intercalating solution or medium so as to insert or intercalate a suitable additive between the carbon hexagon networks and thus form an addition or intercalation compound of graphite. For a more detailed discussion of processes for forming and treating graphite in order to promote interlayer attack reference should be made to U.S. Pat. No. 3,404,061 issued to J. H. Shane, et al.

Once the desired expanded graphite is obtained, the expanded graphite is typically fed into an apparatus comprising a conveyor and various rollers for pressing and forming the graphite into a continuous sheet of foil.

However, a problem inherent in all prior art methods of forming continuous sheets of graphite foil is that when the graphite foil is placed in a high temperature and/or low pressure environment, in which the material is typically used, the surface texture of the graphite deforms such that bubble-like deformations appear on the graphite foil. The formations are believed to be due to reexpansion of the expanded graphite, release of gases, moisture or other factors. The bubble-like deformations detract from the cosmetic appearance of the foil and may, under mechanical or other pressure, eventually burst and possible release the expanded graphite flakes into the surrounding environment.

Since graphite sheets are commonly used as insulators and heat shields, and thus, many uses of graphite foil involve the application in high temperature and/or low pressure environments (i.e. as when the foil is used to line vacuum or standard furnaces as insulation) the deformation of the graphite foil is a particularly common, troublesome and undesirable occurrence. One prior art method attempting to solve this problem is disclosed in U.S. Pat. No. 3,404,061 to Shane et al. In Shane et al., after the graphite material is rolled into a sheet, the foil then passes through a heating means which heats the graphite to an elevated temperature, e.g. 1000° C., so as to cause re-expansion of compressed particles which were not previously completely expanded or which contain residual fluid, gases, etc. After the foil is heated, the graphite sheet is then passed through a final rolling process to recompress the foil to a desired thickness. Of course, the application of high temperature to the already processed foil is time consuming, expensive and is not completely effective in alleviating the above-described problem. Another potential way to avoid the deformation problem is to utilize only highly purified salts in the manufacture of the graphite foil. However, such materials are more expensive and less available than the materials typically used in the commerical manufacture of graphite foil material and would accordingly raise the cost of the graphite foil material and slow down the manufacturing process. It is also very difficult to ensure the purity of the salts.

SUMMARY OF THE INVENTION

The obstacles and drawbacks contained in the prior art are overcome in a graphite material comprising a mass of expanded graphite particles compressed together so as to form a graphite foil having a plurality of apertures disposed on at least one surface thereof whereby said plurality of apertures substantially prevents formation of bubble-like deformations on said at least one surface when said foil is heated and/or exposed to a vacuum. The apertures are approximately one twelfth (1/12") to one inch (1") apart, and preferably about one quarter inch (¼") apart, and are of a depth less than the inch thickness of the material to be punctured.

The process for making the invented material comprises obtaining graphite foil material as is known in the prior art and puncturing at least one surface thereof with apertures of a predetermined size and depth and preferably, in a line arrangement of rows and columns, across the entire surface of the material. In one embodiment of the process, the graphite foil is disposed under a cylinder provided with a plurality of pins radially disposed and outwardly facing from its surface. The cylinder is secured to a flat surface and raised thereabove to a height such that the distance between the ends of the pins facing directly downward and the flat surface is less than the thickness of the material to be punctured. The material is then slid under the roller and the apertures punctured therein. In an alternative process, a flat plate having pins extending from its surface is placed on the graphite foil material to be punctured and the pins are pressed or tapped partially into said material.

Other methods and arrangements of apertures will be apparent from the detailed description provided below.

BRIEF DESCRIPTION OF THE DRAWINGS

FIG. 1 shows a perspective view of a sheet of graphite foil embodying the concepts of the present invention;

FIG. 2 shows an enlarged top plan view of the graphite foil shown in FIG. 1;

FIG. 3 shows a partial cross sectional view of a graphite foil illustrating a second embodiment of the present invention;

FIG. 4 shows a method of making graphite foil according to the present invention and a device useful for said method; and FIG. 5 shows an alternative device useful for the invented process.

DETAILED DESCRIPTION OF THE INVENTION

In FIG. 1 there is shown a perspective view of a sheet of graphite foil 10 having an upper surface 14 and a lower surface 16. Upper surface 14 has disposed thereon a plurality of apertures which extend into upper surface 14 to a predetermined depth. In actual practice it has been found that apertures 12 having a depth of a few millimeters are sufficient to prevent bubble-like deformations from appearing on upper surface 14 when the foil 10 is heated or placed in a vacuum. It has also been found that apertures 12 extending to a depth of a few millimeters do not substantially detract from the foil's insulating and heat shielding properties. Also, as shown in FIG. 1, in the preferred embodiment, the apertures 12 are equidistantly spaced along the entire upper surface of the foil 10. Such an equal and uniform spacing of apertures 12 substantially and evenly prevents the occurrence of the formation of the afore-discussed bubble-like deformations and thus prevents chipping and flaking of the graphite foil 10. In actual practice it has been found that disposing apertures 12 one fourth inch (¼") apart from one another optimally minimizes formation of the aforementioned bubble-like deformations.

In FIG. 2 there is shown an enlarged top plan view of the sheet 10 showing equidistantly spaced apertures 12 disposed in upper surface 14.

In FIG. 3 there is shown partial cross sectional view of a second embodiment of the invented graphite foil having apertures 12 equidistantly disposed on upper surface 14 of foil 10 and also having apertures 18 equidistantly disposed on lower surface 16. As with apertures 12, apertures 18 substantially prevents the bubble-like deformations from occurring on lower surface 16 of foil 10.

In FIG. 4 there is shown one method for making the invented foil. With reference to FIG. 4, a continuous sheet of graphite foil 10A is fed along longitudinal feeding table 28 into punching means 24. Punching means 24 comprises a cylinder 26 which has an axial width which is at least as wide as the width of the continuous sheet of foil 10A. Cylinder 26 has disposed thereon punching pins 20 which are equidistantly disposed around and across cylinder 26 in order to form desired aperture patterns in the continuous sheet of foil 28. Cylinder 26 rotates about axis 19 which is mounted on bracket 22. The counterclockwise direction of cylinder 26 together with the punching action of pins 20 continuously pulls sheet 10A along table 28 in the direction shown by the arrow D of FIG. 4. It will be appreciated that axle 19 and/or cylinder 26 may be rotated by means of a pulley assembly, electric motor (not shown), handle or crank or other well known turning means. Alternatively, as graphite foil 10A is fed through space 29, the cylinder is rotated by the pressure of the foil on the pins 20.

As the sheet of foil 10A enters the space 29 between longitudinal feeding table 28 and punching pins 20, cylinder 26 is rotated, as stated, in a counter-clockwise direction thereby impressing punching pins 20 into the upper surface 16A of continuous sheet of foil 10A thereby creating equidistant substantially uniform depth apertures in the foil. When it is desired to form foil 10A with uniform apertures on lower surface 17A, foil 10A may be turned over so that, when disposed on longitudinal feeding table 28, lower surface 17A faces punching pins 20. The afore-described process with reference to upper surface 16A may then be repeated such that the resulting product will be a continuous sheet of foil having apertures of a substantially uniform depth equidistantly disposed over both the upper surface and the lower surface of the foil. Afterwards, the continuous sheet of foil may be cut into smaller sizes or formed into a large roll for later use.

Another method of making the invented graphite foil material utilize a device as shown in FIG. 5. As shown, the device comprises a flat plate 30, generally rectangular in shape, having a plurality of pins 31 provided therein at regular intervals. The plate may be placed on the surface of the graphite foil and either pressed or lightly struck with a hammer, rubber mallet or the like to impress the pins into the surface to make the apertures. This is repeated until at least one entire surface is covered with the apertures.

The apertures can range from approximately one twelfth inch (1/12") to one inch apart, and are preferably about one quarter inch (¼") apart. Obviously, graphite material having a greater density of holes is less likely to contain deformations; however, this must be balanced against the insulating capacity of the material which decreases as the density of the apertures increases.

In view of the fact that the invented material is often used as insulation for ovens and vaccuum furnaces, it is not believed to be desirable to puncture the foil completely therethrough because the insulating capability of the material will be somewhat diminished by the loss of heat through the apertures. Therefore, it is preferred that the pins are of a length, and are so positioned relative to the foil to be punctured, that the apertures extend only partially through the foil.

As used in the specification and claims, the terminology "graphite sheet" and "graphite foil" is intended to include within its meaning graphite in the form of flexible webs, strips, papers, tapes, foils, films, mats and the like. The term "graphite sheet" and "graphite foil" thus include within its meaning substantial flat, flexible, graphite material or stock of any length and width. The term aperture is not limited by the size and shape of the apertures or their arrangement or orientation as shown in the appended drawings or the detailed description. It is contemplated as being within the scope of the present invention that the pins and the corresponding apertures may have any shape.

EXAMPLE 1

A custom made metal roller was obtained having a diameter of four inches (4"), and 6000 pins distributed uniformly about its surface and approximately one-fourth inch (¼") apart in even rows and columns. The roller was mounted on a flat table, the distance between the roller and flat table being adjustable to provide perforations in the graphite material of different specified depths, as desired.

A sheet of finished graphite foil was placed on the flat table and run under the roller. The pins punctured holes in the entire upper surface graphite material.

EXAMPLE 2

Six bricks of 0.120 inch graphite foil were obtained and divided into three groups (in duplicate), (i) control (nonpunched); (ii) single side punched; and (iii) double side punched.

The punching was performed using eight Warner & Swazey Pin Drafter (Trademark) bars, each bar being approximately six (6) inches long with twelve (12) pins per inch and with the one quarter inch (¼") between the rows of pins. Eight faller bars were hand held as a group, placed on each surface to be punctured and gently struck with a rubber mallet so as not to cause the pins to pierce completely through the graphite foil.

After making all of the apertures as described above, the groups of bricks were placed in a muffle furnace and heated to 900° Centigrade for 30 minutes. The results were dramatic. Both duplicate controls (unpunched) had severe bubbling, except along the edges. There was no bubbling or other deformation on either the single side punched or the both side punched duplicate bricks of graphite foil.

The above described invention may be embodied in other specific forms without departing from the spirit or essential characteristics thereof. The present embodiments are to be considered in all aspects as illustrative and unrestrictive, the scope of the invention being indicated by appended claim rather than by the foregoing description, and all changes which come within a meaning and range of equivalency are, therefore, intended to be embraced therein.

We claim:

1. A graphite material comprising a mass of expanded graphite particles compressed together so as to form a graphite foil having a first and second surface and porous material therebetween, said foil having a first plurality of apertures disposed through said first surface thereof and into said porous graphite material whereby said first plurality of apertures substantially prevent formation of bubble-like deformations on said first surface when said foil is heated or exposed to a vacuum.

2. The graphite material according to claim 1 further comprising a second plurality of apertures disposed through said second surface and into said porous graphite material of said foil whereby said second plurality of apertures substantially prevent formation of bubble-like deformations on said second surface.

3. The graphite material according to claim 1 wherein said first plurality of apertures are of a predetermined depth.

4. The graphite material according to claim 3 wherein said predetermined depth is less than the thickness of said graphite foil.

5. The graphite material according to claim 1 wherein said first plurality of apertures are substantially equidistantly spaced apart from one another about said first surface.

6. The graphite foil according to claim 5 wherein said first plurality of apertures are spaced in the range of one twelfth inch (1/12") to one inch (1") apart from one another in said first surface.

7. The graphite foil according to claim 6 wherein said first plurality of apertures are spaced one quarter inch (¼") apart from one another in said first surface.

8. A graphite foil formed by the process comprising:
compressing a mass of expanded graphite flakes so as to form a graphite foil having a first and second surface and porous graphite material therebetween; and
forming a first plurality of apertures through said first surface and into said porous graphite material of said foil whereby said first plurality of apertures substantially prevent the formation of bubble-like deformations on said first surface when said foil is heated or exposed to a vacuum.

9. The graphite material formed by the process according to claim 8 wherein said process further comprises forming a second plurality of apertures through said second surface and into said porous graphite material of said coil whereby said second plurality of apertures substantially prevents formation of bubble-like deformations on said second surface once said foil is heated or exposed to a vacuum.

10. The graphite material formed by the process according to claim 7 wherein said process further comprises spacing said first plurality of apertures substantially equidistantly apart from one another about said at least one surface.

11. The graphite material formed by the process according to claim 10 wherein said first plurality of apertures are spaced in the range of one twelfth inch (1/12") to one inch (1") apart from one another on said at least one surface.

12. The graphite material formed by the process according to claim 11 wherein said first plurality or apertures are substantially uniformly spaced near about one fourth inches (¼") apart from one another.

13. The graphite material formed by the process according to claim 9 wherein process further comprises forming said first plurality of apertures to a substantially uniform depth.

14. The graphite material formed by the process according to claim 13 wherein said predetermined depth less than the thickness of said graphite material.

15. A process form forming graphite foil comprising the steps of:
compressing a mass of expanded graphite particles together so as to form a graphite foil having a first and second surface and porous graphite material therebetween;
forming a first plurality of apertures through said first surface and into said porous graphite material of said foil whereby said first plurality of apertures substantially prevents formation of bubble-like deformations on said first surface once said foil is heated or exposed to a vacuum.

16. The process according to claim 15 further comprising the step of forming a second plurality of apertures through said second surface and into said porous graphite material of said foil whereby said second plurality of apertures substantially prevents formation of bubble-like deformations on said other surface once said foil is heated or exposed to a vacuum.

17. The process according to claim 15 wherein said step of forming said first plurality of apertures further comprises the step of spacing said first plurality of apertures substantially uniformly a predetermined distance apart from one another.

18. The process according to claim 17 wherein said first plurality of apertures are spaced in the range of one twelfth inch (1/12") to one inch (1") apart from one another on said at least one surface.

19. The process according to claim 18 wherein said predetermined distance is about one fourth inch (¼").

20. The process according to claim 19 wherein said steps of forming said first plurality of apertures further comprises the step of forming said first plurality of apertures having a predetermined depth.

21. The process according to claim 20 wherein said depth is less than the thickness of said graphite foil.

* * * * *

UNITED STATES PATENT AND TRADEMARK OFFICE
CERTIFICATE OF CORRECTION

PATENT NO. : 4,752,518
DATED : 6/21/88
INVENTOR(S) : Lohrke et al.

It is certified that error appears in the above-identified patent and that said Letters Patent is hereby corrected as shown below:

| COLUMN | LINE | DESCRIPTION |
|--------|------|-------------|
| 01 | 34 | delete "c" insert --$\underline{c}$-- |
| 01 | 35 | delete "a" insert --$\underline{a}$-- |
| 01 | 36 | delete "c" insert --$\underline{c}$-- |
| 01 | 37 | delete "a" insert --$\underline{a}$-- |
| 01 | 39 | delete "c" insert --$\underline{c}$-- |
| 01 | 68 | delete "c" insert --$\underline{c}$-- |
| 02 | 12 | delete "c" insert --$\underline{c}$-- |
| 02 | 40 | delete "c" insert --$\underline{c}$-- |

Signed and Sealed this

Twentieth Day of December, 1988

*Attest:*

DONALD J. QUIGG

*Attesting Officer*   *Commissioner of Patents and Trademarks*